(12) United States Patent
Agapiou et al.

(10) Patent No.: US 7,209,799 B2
(45) Date of Patent: Apr. 24, 2007

(54) PREDICTIVE MODELING OF MACHINING LINE VARIATION

(75) Inventors: John S. Agapiou, Rochester Hills, MI (US); Eric A. Steinhilper, Harrison Township, MI (US); Jeffrey M. Alden, Ypsilanti, MI (US); Aloysius Anagonye, Southfield, MI (US); Pulak Bandyopadhyay, Rochester Hills, MI (US); Fangming Gu, Rochester Hills, MI (US); Patrick M. Hilber, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 77 days.

(21) Appl. No.: 11/106,041

(22) Filed: Apr. 14, 2005

(65) Prior Publication Data

US 2005/0234586 A1    Oct. 20, 2005

Related U.S. Application Data

(60) Provisional application No. 60/562,144, filed on Apr. 14, 2004.

(51) Int. Cl.
    G06F 19/00    (2006.01)
    G06F 17/50    (2006.01)
(52) U.S. Cl. .............. 700/177; 700/174; 700/193; 700/121; 703/22
(58) Field of Classification Search .......... 700/174, 700/177, 193, 121; 703/22
    See application file for complete search history.

(56) References Cited

U.S. PATENT DOCUMENTS 4,520,595 A * 6/1985 Diener ................. 451/28
5,084,660 A * 1/1992 Sasaki et al. ........... 318/569
5,199,158 A * 4/1993 Wioskowski et al. ..... 29/563
5,691,909 A * 11/1997 Frey et al. .............. 700/159
6,306,011 B1 * 10/2001 Perry et al. ............. 451/38
6,349,237 B1 * 2/2002 Koren et al. ............ 700/96
6,883,158 B1 * 4/2005 Sandstrom et al. ...... 716/19

OTHER PUBLICATIONS

"Multi-Operational Machining Processes Modeling for Sequential Root Cause Identification and Measurement Reduction" -Wang et al, ASME vol. 127, Aug. 2005.*
Chandra et al., Finite Element Based Fixture Analysis Model for Surface Error Predictions Due to Clamping and Machining Forces, MED-vol. 6-2, Manufacturing Science and Technology, vol. 2, ASME 1997, pp. 245-252.
Chase et al.,Least Cost Tolerance Allocation for Mechanical Assemblies with Automated Process Selection, Failure Prevention and Reliability,ASME, DE-vol. 16, 1989, pp. 165-171.
Choudhuri et al., Tolerance Analysis of Machining Fixture Locators, Journal of Manufacturing Science and Engineering, ASME, vol. 121, May 1999, pp. 273-281.
Djurdjanovic et al., Linear Space Modeling of Dimensional Machining Errors, Trans. of NAMRI/SME, vol. XXIX, 2001, pp. 541-547.
Fainguelernt et al., Computer Aided Tolerancing and Dimensioning in Process Planning, CIRP Annals, 1986, vol. 35/1, pp. 381-386.
Frey et al., Swept Envelopesof Curring Tools in Integrated Machine and Workplace Error Budgeting, CIRP Annals, 1997, vol. 46/1, pp. 475-480.

(Continued)

Primary Examiner—Michael D. Masinick
(74) Attorney, Agent, or Firm—Kathryn A. Marra

(57) ABSTRACT

A multistage machining process includes a plurality of stations. Workpiece feature quality is predicted based on decomposition of the machining process into sources of variation, reticulation of the machining process into machining stations and error models that account for significant contributions to feature quality including from categorical sources of variation.

20 Claims, 8 Drawing Sheets

OTHER PUBLICATIONS

Kawlra et al., Development and Application of a Methodology for Minimizing Costs Based on Optimal Tolerance Allocation, Ph.D. Thesis, University of Michigan, 1994.

Lee et al., Tolerances: Their Analysis and Synthesis, Journal of Engineering for Industry, ASME, vol. 112, May 1990, pp. 113-121.

Maier-Speredelozzi et al., Selecting Manufacturing System Configurations Based on Performance Using AHP, Trans. of NAMRI/SME, vol. XXX, 2002, pp. 637-644.

Speckhart, Calculation of Tolerances Based on Minimium Cost Approach, Journal of Engineering for Industry, ASME, vol. 94, May, 1972, pp. 447-453.

Spotts, Allocation of Tolerances to Minimize Cost of Assembly, Journal of Engineering for Industry, ASME, vol. 92, Aug. 1973, pp. 762-764.

Weill et al., The Influence of Fixture Positional Errors on the Geometric Accuracy of Mechanical Parts, Proc. of CIRP Conf. On PE & MS, Sep. 1991.

Zhang et al., Graph-Based Setup Planning and Tolerance Decomposition for Computer-Aided Fixture Design, INT. J. Prod. Res., 2001, vol. 39, No. 14, pp. 3109-3126.

Gu et al., A Model for the Prediction of Surface Flatness in Face Milling, Journal of Manufacturing Science and Engineering, v. 119, pp. 476-484, 1997.

* cited by examiner

PREDICTIVE MODELING OF MACHINING LINE VARIATION

CROSS REFERENCE TO RELATED APPLICATIONS

This application claims priority to U.S. provisional patent application Ser. No. 60/562,144 filed on Apr. 14, 2004, which is hereby incorporated herein by reference in its entirety.

TECHNICAL FIELD

The present invention is related to production systems. More particularly, the invention concerns multistage manufacturing systems.

BACKGROUND OF THE INVENTION

Multistage manufacturing systems (MMS) are commonplace, diverse in variety and are employed in various aspects of many manufacturing industries. Complex mechanical assemblies, such as automatic transmissions, and vehicle assembly plant processes, such as body assembly operations, are examples of MMS related specifically to assembly systems. However, MMS are also widely employed in complex fabrication systems, e.g. semi-conductor fabrication, and complex machining systems, e.g. internal combustion engine block and head machining. Some hybrid MMS include aspects from multiple types of manufacturing systems including assembly, fabrication and machining.

A common characteristic of MMS is a multiplicity of well defined processing operations and stations. MMS also typically involve multiple fixture exchanges and process datum changes. This is particularly evident in the complex machining and assembly of engine blocks and heads or of transmission cases, for example.

Variations throughout MMS affect the quality of the final manufactured product. Each of the multiplicity of operations and stations and associated transfers of workpieces therebetween are potential sources for introducing variation into the final product. Trial and error approaches are commonly employed in improving quality of parts produced by machining MMS. However, such techniques tend to be lengthy and not generally well structured and understood with respect to specific manufacturing variables.

Practices are known for simulating component part tolerance stack-up in assembly processes and for providing conformance-type analysis of such simulations. Final product conformance to print may thereby be statistically predicted and component tolerances adjusted—relaxed or tightened—to effect quality and cost improvements to the final product.

Complex machining processes, however, include a variety of inputs and sensitivities not generally shared by assembly systems or other types of manufacturing systems. For example, machining variations can be affected by variations in raw castings, variations in accuracy and repeatability of machine motion, geometric variations of the workpiece and fixture, station transfers and fixture changes, elastic deformation of the workpiece and fixtures due to clamping forces, and machining variations due to cutting forces.

SUMMARY OF THE INVENTION

A method for predicting feature quality in workpieces produced by a machining process includes decomposing the machining process into sources of variation and reticulating the machining process into machining stations. Workpiece feature errors are determined at each machining station based on the sources of variation. These feature errors are summed into station level errors which are used to statistically predict feature quality.

The determination of workpiece feature errors further includes decomposing each machining station into generic machining process steps and determining workpiece errors at each generic machining process step based on the sources of variation uniquely related to the respective generic machining process step.

The sources of variation may include machine variations, fixture variations, or workpiece variations. Machine variations include such non-limiting examples as toolpath variations, machine distortions and combinations thereof. Fixture variations such non-limiting examples as fixture pad variations, fixture distortions and combinations thereof. Workpiece variations include such non-limiting examples as casting variations, workpiece pad variations, workpiece clamping distortions, workpiece cutting distortions, workpiece pressing distortions and combinations thereof.

A machining process includes at least one machine and fixture. A method for predicting feature quality in workpieces produced by the machining process includes identifying a workpiece feature and a corresponding quality metric desirably predicted. The machine process is then reticulated into machining stations. A plurality of station level error determinations is performed for each of at least one of the machining stations. Each such determination includes the provision of errors that significantly affect the quality metric of the feature and further includes summing the errors to provide a station level error for each determination. A respective plurality of station level errors is provided for each of the at least one of the machining stations. Station level errors are then used to statistically predict feature quality with respect to the quality metric.

The entire machining process may be considered in predicting workpiece feature quality and the station level errors from each of the at least one of the machining stations are summed in statistically predicting feature quality.

A station level workpiece feature quality is predicted at a particular one of the machining stations and the station level errors from each of the at least one of the machining stations within a range beginning with an initial machining station and ending with the particular one of the machining stations are summed in statistically predicting station level feature quality. The initial machining station may be selected as the first machining station of the machining process or as any machining station that is intermediate the first machining station and the particular one of the machining stations.

The errors provided may be propagated from errors effected upon another workpiece feature at another machining station.

The errors may include errors resulting from machine variations, fixture variations, or workpiece variations. Machine variations include such non-limiting examples as toolpath variations, machine distortions and combinations thereof. Fixture variations include such non-limiting examples as fixture pad variations, fixture distortions and combinations thereof. Workpiece variations include such non-limiting examples as casting variations, workpiece pad variations, workpiece clamping distortions, workpiece cutting distortions, workpiece pressing distortions and combinations thereof. The errors may include errors categorized as geometric errors, static errors, dynamic errors and combinations thereof. The errors may include measured errors or modeled errors.

BRIEF DESCRIPTION OF THE DRAWINGS

The present invention will now be described, by way of example, with reference to the accompanying drawings, in which.

DESCRIPTION OF THE PREFERRED EMBODIMENT

The present invention will now be described with respect to an exemplary multistage manufacturing system comprising a plurality of operations and stations within the operations for the production of an internal combustion engine cylinder head assembly. The manufacturing process is defined at a front end by a material or workpiece input—in the present example a cylinder head casting—and at the back end by a final product—in the present example a completely machined cylinder head. In practice with respect to exemplifying the present invention, the manufacturing process is further delimited with respect to particular operations and stations having been identified as potentially significantly influencing a predetermined feature of interest. Features as used herein and as understood by one having ordinary skill in the art are understood to include geometric aspects of the machined work piece. In the present example, the feature of interest is the deck face of the cylinder head as will be further described herein below. In practice, various and many features may be of interest in practicing the present invention and may additionally comprise such non-limiting features as surfaces, holes, threads, radii, grooves, bosses, etc. A quality characteristic or metric, in this case flatness, is also required as the objective measure of conformance or acceptability of the workpiece with respect to the feature of interest. In practice, various and many quality characteristics may be of interest in practicing the present invention and may additionally comprise such non-limiting characteristics as profile, straightness, circularity, cylindricity, parallelism, perpendicularity, concentricity, runout, etc.

Figure 1:
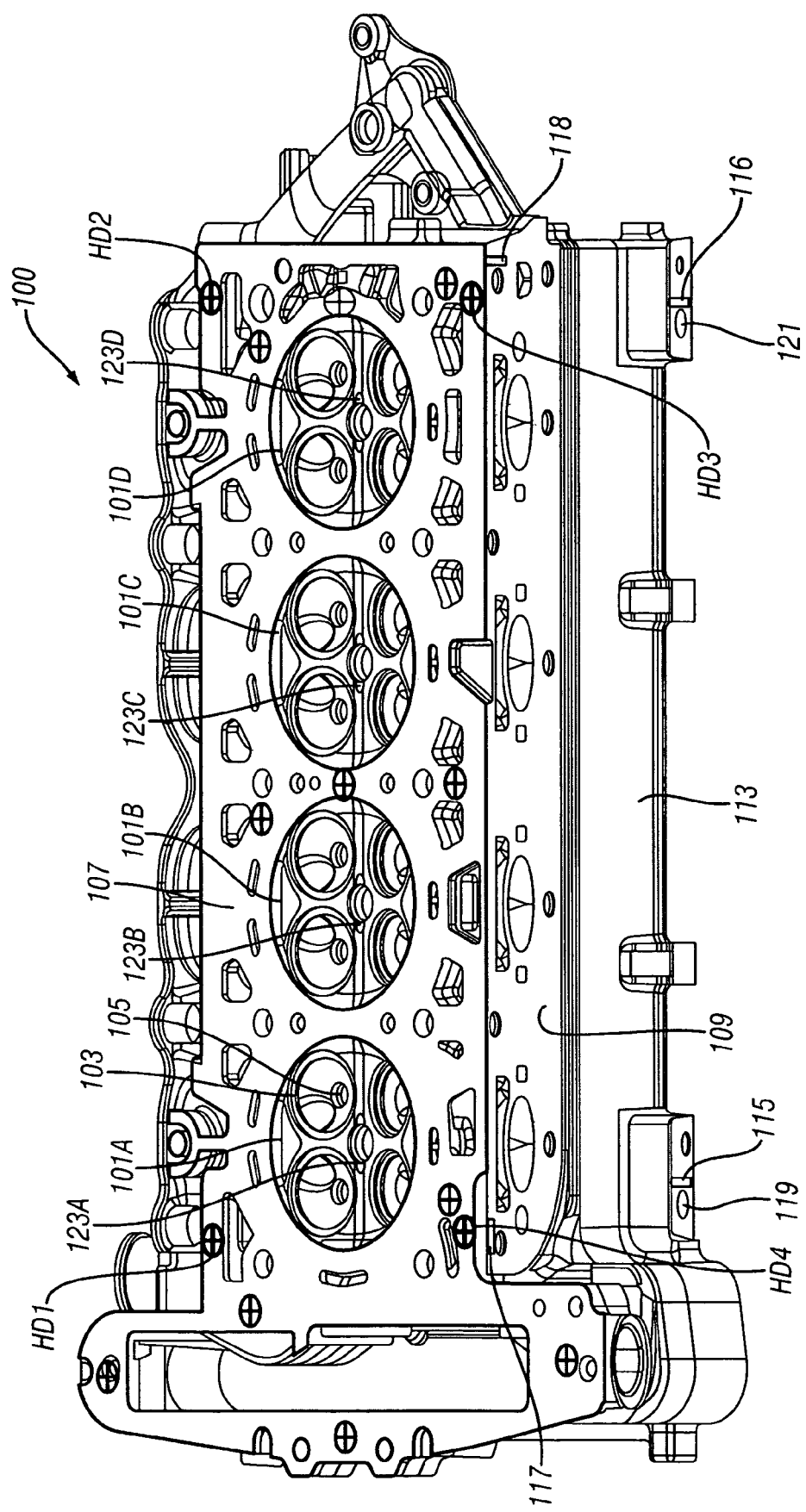
FIG. 1 illustrates an internal combustion engine cylinder head including various features and aspects thereof used in exemplifying the present invention with respect thereto.

With reference to FIG. 1, a cylinder head 100 is illustrated including four cylinder head domes corresponding to one bank of combustion cylinders in an eight cylinder internal combustion engine configuration. Each dome 101A–101D includes a plurality of valve seat pockets 103 and guide holes 105. Cylinder head 100 also includes deck face 107 which, in assembly, mates to a corresponding deck face of an engine cylinder block with an intermediary head gasket therebetween. Exhaust face 109 is included on cylinder head 100 and mates to a corresponding surface of an exhaust runner assembly with an intermediary exhaust gasket therebetween. Cylinder head 100 also includes cover rail 113 adjacent exhaust face 109 opposite deck face 107. Also illustrated though not called out by separate reference numeral are engine coolant passages for engine coolant circulation within cylinder head 100. More specific description of these aspects of cylinder head 100, and additional description of other aspects thereof, will appear herein below.

Figure 2:
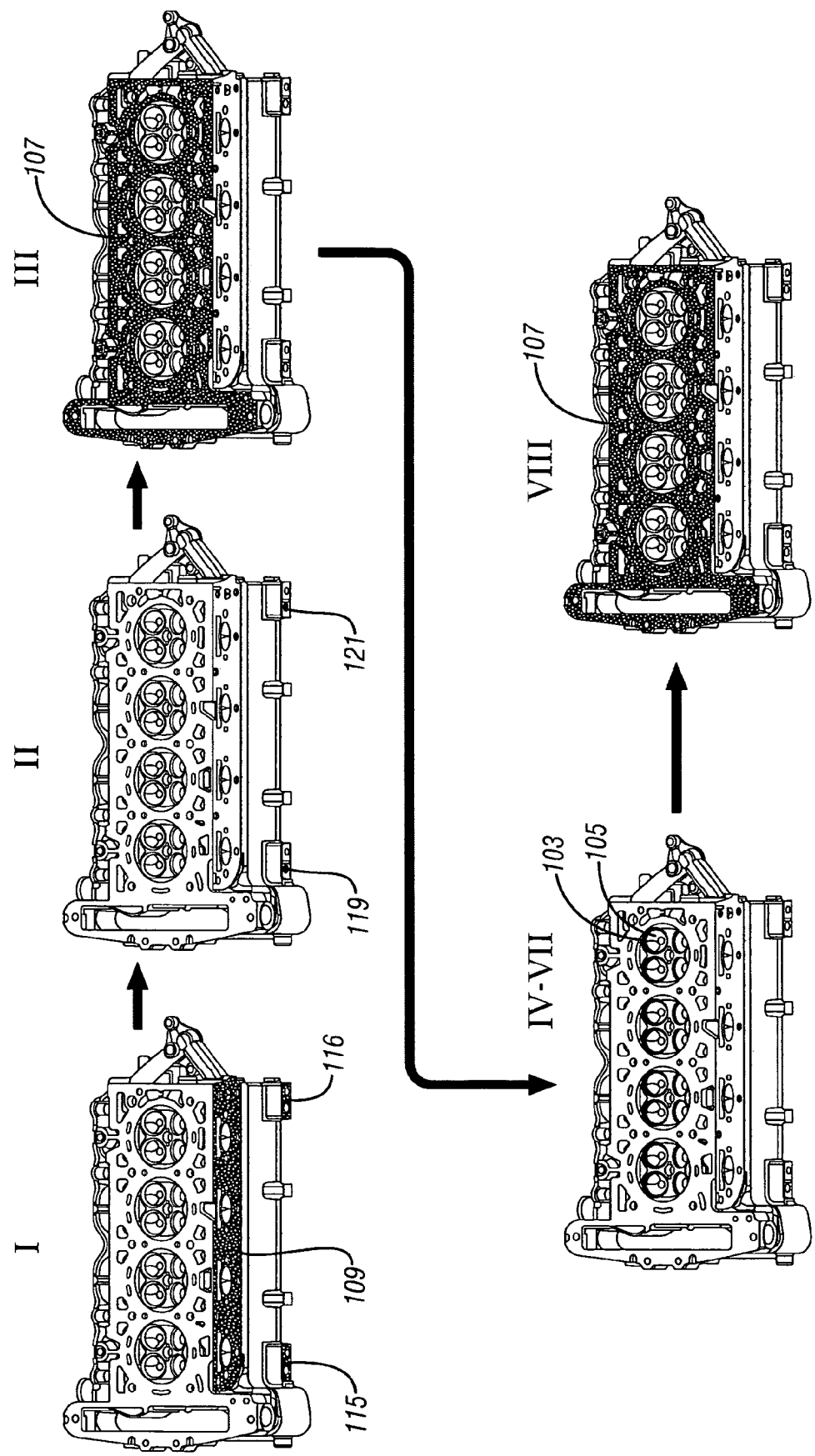
FIG. 2 is a schematic representation of certain manufacturing stations and transfers in a multistage manufacturing system for the cylinder head of FIG. 1.

Having thus described cylinder head 100, stations of cylinder head 100 manufacturing process having potentially significant influence upon the flatness of deck face 107 are next described with additional reference to FIG. 2. Prior to entry into the present manufacturing process, the head casting is rough machined including the deck face 107. A number of additional reference planes parallel to this rough machined deck face, including a plane through inspection points 123A–123D (i.e. combustion chamber pads) on the respective domes 101A–101D, are also established prior to entry into the present process.

A first milling operation is performed at a first station (I) to establish the exhaust face 109 and two workpiece locating pads 115 and 116 along the cover rail 113. The exhaust face 109 defines the primary reference plane for cylinder head 100 manufacturing operations and the two locating pads 115 and 116 are co-planar therewith. The primary reference plane also may be referred to as the M plane. Two additional workpiece locating pads 117 and 118 are additionally defined on the exhaust face 109. The four workpiece locating pads 115–118 are therefore located within this primary reference plane. The four locating pads 115–118 provide fixturing surfaces for certain of the remaining manufacturing process stations of potential significant influence upon the flatness of deck face 107.

At a second station (II), two locator holes 119 and 121 are added and comprise the primary machining locator holes and datum references for most of the cylinder head dimensions. These holes 119 and 121 are machined relative to the plane through the combustion chamber pads located on the dome roofs and a second plane perpendicular to the primary reference plane and aligned with the holes 119 and 121 thereby allowing control of the combustion chamber volume through the present manufacturing process. A multi-spindle head is used to first drill and then bore these holes 119 and 121.

It can now be appreciated that orientation of cylinder head 100 in a variety of operation and station specific fixtures may now be accomplished relative to the primary reference plane as defined by the locating pads 115–118 and locator holes 119 and 121 in a 4-2-1 locating scheme. Therefore, prior to entry to a third station (III) whereat the deck face undergoes a rough milling operation, cylinder head 100 is oriented to a fixture making use of four fixture locating pads corresponding to the four workpiece locating pads 115–118 of cylinder head 100 and a pair of locating pins (B and C) corresponding to the pair of workpiece locator holes 121 and 119, respectively, of cylinder head 100. The fixture for this station is also characterized by support of the cover face which is opposite and parallel with the deck face. Cylinder head 100 is further secured to the fixture by clamping the workpiece. At the third station, the deck face is rough milled to an intermediate height above final surface height of the deck face 107.

Prior to entry to a fourth station (IV) whereat powdered metal valve seats and valve guides are press fit into corresponding ones of pre-machined valve seat pockets 103 and guide holes 105 corresponding to one of the cylinder domes 101A–101D, cylinder head 100 is oriented to a different fixture making use of four fixture locating pads corresponding to the four workpiece locating pads 115–118 of cylinder head 100 and a pair of locating pins corresponding to the pair of workpiece locator holes 119 and 121 of cylinder head 100. Cylinder head 100 is further secured to the fixture by clamping the workpiece. At the fourth station, the valve seats and guides are pressed into an interference fit with respective valve seat pockets and guide holes. Fifth, sixth and seventh stations (V–VII) provide similar pressing operations for interference fitting the remaining valve seats and guides to respective valve seat pockets and guide holes of the remaining ones of the cylinder domes 101A–101D. The fourth, fifth, sixth and seventh stations, however, share common fixturing of cylinder head 100 and therefore there is no workpiece re-fixturing associated with the described valve seat and guide pressing station transfers.

Prior to entry to an eighth station (VIII) whereat the deck face undergoes a finish milling operation, cylinder head 100 is oriented to a different fixture making use of four fixture locating pads corresponding to the four workpiece locating pads 115–118 of cylinder head 100 and a pair of locating pins corresponding to the pair of workpiece locator holes 119 and 121 of cylinder head 100. Fixturing for the finish milling at this eighth station is similar to the fixturing for the rough milling at the third station; however, at this eighth station the cover face is contemporaneously machined in the opposite direction and therefore there is no cover face support. Cylinder head 100 is further secured to the fixture by clamping the workpiece. At the eighth station, the deck face is finish milled to a final surface height of the deck face 107.

In accordance with the present invention, part-to-part variation of the deck face 107 flatness of the cylinder head 100 manufactured in accordance with the station operations and transfers outlined above is accurately predicted. Various error models are constructed for use in the determination of station level workpiece feature errors. More specifically, the various errors encountered related to the machining operations performed on the workpiece are modeled based on an analyses of the sources of variation. These errors, and hence the corresponding models, account for such geometric, static and dynamic errors as may be incorporated into the error models in accordance with a significance determination. Tracking of the errors through the manufacturing process stations allows for accurately accumulating errors with the end objective of predicting the overall deck face flatness. The present invention provides upstream process design input and advantages including sensitivity analysis, optimization, ramp-up and validation. Significantly in the present invention, the error models are able to be constructed based substantially upon manufacturing process technical specifications rather than part print tolerances. Part print tolerances are decoupled from the actual manufacturing process and may or may not be attainable within the process capabilities. In accordance with the present invention as detailed further herein below, measured part variations may be used as input to calibrate error models and as external data in validating model accuracy.

In an already specified machining line, the process sheets are used in model construction. In a manufacturing process dominated by machining operations wherein material removal defines the features of interest, variation is predicted or plant data is used to specify the actual capabilities of the machining line. Each station of interest in the machining line is modeled to include each type of error which may contribute to the station error. Of course, not all errors are of interest and, frequently, with the intent of simplifying the model or saving time, only the most significant station level variations will be included. Very small variations, for example two orders of magnitude smaller than the most significant variations, may be ignored or approximated without substantially affecting the quality of the model.

Figure 3:
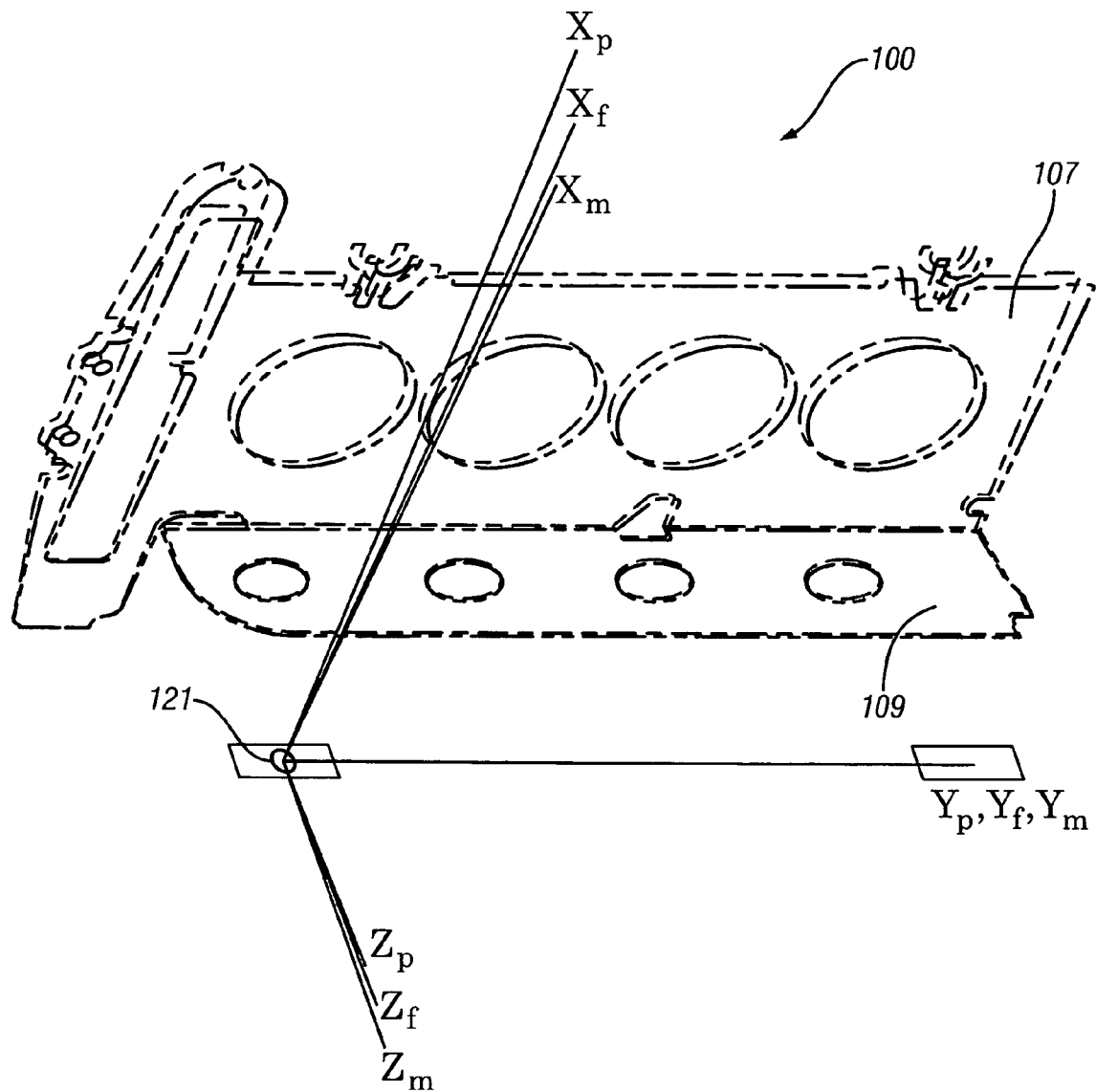
FIG. 3 is a representation of deck face and exhaust face surfaces of the cylinder head of FIG. 1 illustrative of workpiece, fixture and machine coordinate systems and alignment deviations.

Additional reference is now made to FIG. 3 generally illustrating surface outlines of the exemplary cylinder head 100. Therein, deck face 107 and exhaust face 109 are specifically labeled. The nominal centerline of the locating pin B (corresponding to locating hole 121) where it intersects the nominal primary reference plane (corresponding to a plane parallel to the exhaust face 109) defines the origin of the machine coordinate system. In a Cartesian coordinate system, the Z-axis is commonly selected as the same direction as the machine Z-axis. In this coordinate system, the deck face is at negative Z values. The Y-axis is the vector from the B and C locating pins. And, the X-axis completes the coordinate system according to the right-hand rule. This coordinate system is referred to as $X_m Y_m Z_m$ and is further characterized in that the Z-axis corresponds to the machine spindle axis; the X-axis corresponds to the machine longitudinal axis; and the Y-axis corresponds to the machine transverse axis In a nominal situation, the workpiece coordinate system, $X_p Y_p Z_p$, and the fixture coordinate system, $X_f Y_f Z_f$, coincide with the machine coordinate system, $X_m Y_m Z_m$. Throughout the machining line, the three coordinate systems inevitably will not coincide (as illustrated), and deviations and variations may occur between any of the coordinate systems.

Figure 4:
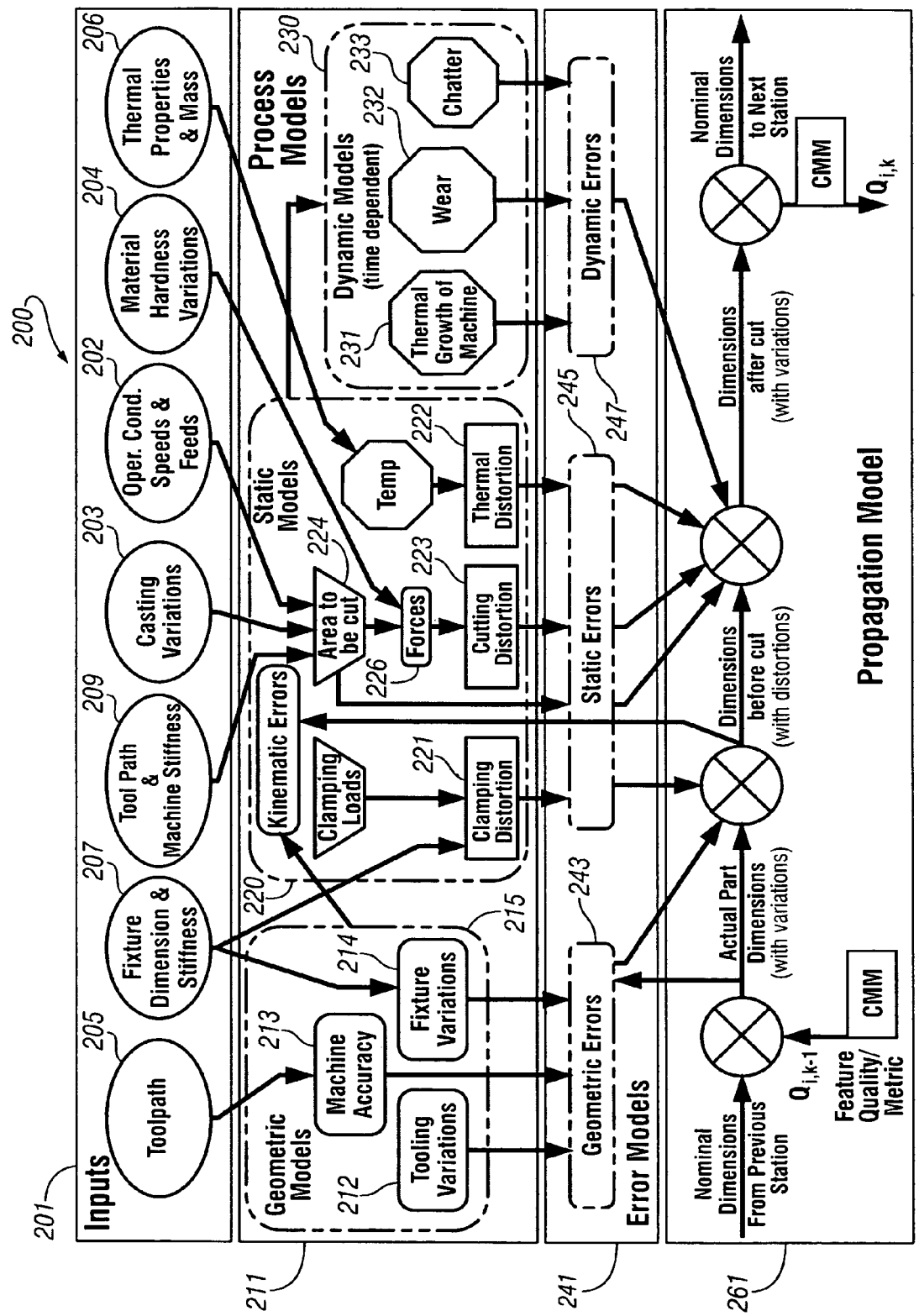
FIG. 4 illustrates a station level workpiece error generation model including inputs, process models, error models and propagation model in accordance with the present invention.

FIG. 4 is additionally referenced in conjunction with the description set forth herein below in representing various relationships among various factors relevant to the predictive determination of feature quality metrics, generally, and cylinder head deck face flatness, particularly, in accordance with the present invention. FIG. 4 illustrates a workpiece quality prediction model 200 having four major sub-divisions labeled individually as inputs 201, process models 211, error models 241 and propagation model 261. Inputs 201 generally correspond to such basic parameters that can readily be measured in the manufacturing system processes, estimated from using analytical tools (e.g. finite element analysis) or via provision from outside sources (e.g. workpiece supply chain; standard physical quantities; machine vendors; etc.). Process models 211 generally correspond to individual machining processes and other manufacturing processes as relate to workpiece operations as further described herein below. Process models 211 provide a variety of process related error type predictions which are provided to error models 241. Propagation model 261 generally provides station-to-station tracking, accumulation and propagation of errors used in the final predictive determination of workpiece feature quality.

As previously indicated, each station of interest in the machining line is modeled to selectively include geometric, static and dynamic errors which significantly contribute to the station error. A brief description is now given of the different types of errors that may generally characterize machining lines and may specifically apply to certain of the stations as further described herein below. Specific examples are also set forth in the example of deck face 107 flatness in accordance with an exemplary model construction and selected data resources. As well, the relationship between the various station level errors as relate to station transfers and error propagation is also set forth herein below beginning with geometric errors in general and specifically the cylinder head 100 casting.

Casting variations 203 are one of the specific types of inputs as shown in Inputs 201 of FIG. 4. Casting tolerances in general tend to be rather large and, in practice, often significantly exceed actual casting variations. Therefore, it is preferable that casting variation inputs be obtained from plant data and more preferably as part of the casting manufacturing process as a provision from the casting supplier. Use of part print tolerances, particularly where there are large spreads between actual variations and print tolerances, would undesirably result in predicted variations of the final machined part not well correlated to the actual machining line (i.e. excessively large predicted variations). As described above, the cylinder head 100 casting undergoes a rough machining, typically performed as part of the casting operations. This includes rough machining of the deck face. This rough machined deck face provides a plurality of deck face height measurements, for example at four distributed locations substantially as identified in FIG. 1 as HD1–HD4. Casting error is determined such as by a Gaussian distribution fit to such data. Such casting measurements are made relative to combustion chamber pads 123A–123D. Mean deviation measurements of the combustion chamber pads 123A–123D are also made at this point. Measurements may come from any of a variety of schemes including hard gages and coordinate measurement machines (CMM), the latter being preferred. Casting geometric error at any station level, k, is represented as $e_{casting_k}$.

Fixture dimension & stiffness variations 207 are another type of input to describe the variation of the fixture elements (locating pads and pins) on which the corresponding workpiece features 115–121 of cylinder head 100 are met for positioning the cylinder head 100 on the fixture. The fixture is manufactured with certain specification tolerances that are used in the geometric models 215 to define how the fixture variations will influence the position of the cylinder head 100 in the fixture. The stiffness of the fixture is also an input and it is used to estimate its deflection or distortion under the cutting forces during metal cutting in the static models 220. In addition, fixture source variation may be described with respect to fixture positioning (understood to be relative to the machine) and fixture orientation (understood to be relative to the machine's table).

The tool path & machine stiffness variations 209 are another type of input to describe the variation in the tool path based on the machine axes errors such as straightness and squareness of the guide ways, machine spindle squareness and runout errors, and those due to the deflection of the machine structure under the influence of the cutting loads.

The operating conditions—that is the cutting speeds and feeds of the machining process 202—are another type of input affecting the performance of the machine. They affect the cutting forces through their influence on the cross section of the generated chips during metal cutting (the area to be cut 224). The cutting forces 226 in turn affect the cutting distortion 223 of the cylinder head 100. Thus far, these inputs have affected only the Static Models 220 of the Process Models as indicated in 211.

The material hardness variations 204 is used to define the variation of the cylinder head 100 material among different batches because it affects the cutting forces in the static models 220 and dynamic models 230. The thermal properties 206 of the materials (the cylinder head 100 and cutting tool) affect the cutting temperature in the static models 220 and dynamic models 230 that affects the thermal distortion 222 of the cylinder head 100 and the thermal growth of the machine tool 231 contributing to the static errors 245 and dynamic errors 247.

The same inputs 201 also impact the error models 241 through the static errors 245. On a case by case basis, the static models, which may be based on empirical or analytical models, are evaluated to determine the actual errors (or displacements of some portion of the feature from its nominal position). The error models 241 are decomposed into geometric errors 243, static errors 245, and dynamic errors 247. The geometric errors are estimated from the geometric models 211 using the tooling variations 212, machine accuracy and repeatability 213, and fixture variations 214. The geometric models are described with respect to the coordinate system to define errors during machining in X, Y, and Z axes of the cylinder head 100. Likewise, the static errors 245 and the dynamic errors 247 are used to define the errors in X, Y, and Z axes of the cylinder head 100. These error models are developed based on the data generated from the static models 220 and the dynamic models 230 using simulations from empirical models or Finite Element Analysis. A procedure similar to the one used to obtain the static errors 245 from static models 220 is used to obtain the dynamic errors 247 from the dynamic models 230.

Machine axis misalignment is a potential source of error. However, it is recognized that absent significant destabilizing events (e.g. machine rebuild), misalignment induced errors may be ignored, at least with respect to two of the three machine axes. A third axis corresponding to the machine spindle longitudinal translation (relative to the B and C locating pins on the fixture) is, however, considered to have potential for causing variations of significance due, predominantly, to the length of spindle travel which in the present example is in the range of hundreds of millimeters. Even small misalignments, therefore, may cause significant variations over the full range of spindle travel or the entire machined surface. These errors are either measured during the machine's setup procedure or after certain maintenance is performed. In addition, the machine tool builder as a specification of the machine provides the upper bounds of these errors. These errors may change from period to period due to wear and tear of the machine. Machine axis misalignment error at any station level, k, is represented as $e_{mach\_axis\_misalign_k}$.

Spindle positioning errors in accuracy and repeatability are also known to manifest even though the machine controller specifies the same Z-axis location coordinates for each workpiece. Accuracy and repeatability may be provided by the machine vendor or estimated from machining line data and are illustrated as Toolpath inputs 205 in FIG. 4. Other techniques for determining accuracy and repeatability for machine spindle positioning includes laser interferometry or ball-bar circularity testing, for example. Z-axis machine accuracy and repeatability errors will affect the location of the machined surface of the deck face 107. Modeling of the Z-axis machine accuracy and repeatability errors are illustrated as Machine Accuracy 213 of the geometric models block 215 of Process Models 211 in FIG. 4. It is noted here that certain other factors may impart errors to the Z-axis including, for example, thermal growth of the machine spindle based on such temporal conditions as plant environment, machine up-time, etc. Modeling of such time dependent machine error factors is illustrated generally in dynamic models block 230 of Process Models 211 wherein modeling of the example of thermal growth of the machine spindle is more particularly illustrated as Thermal Growth of Machine 231. Spindle positioning errors at any station level, k, are represented as $e_{mach\_Zaxis\_accur_k}$ and $e_{mach\_Zaxis\_repeat_k}$.

Figure 5:
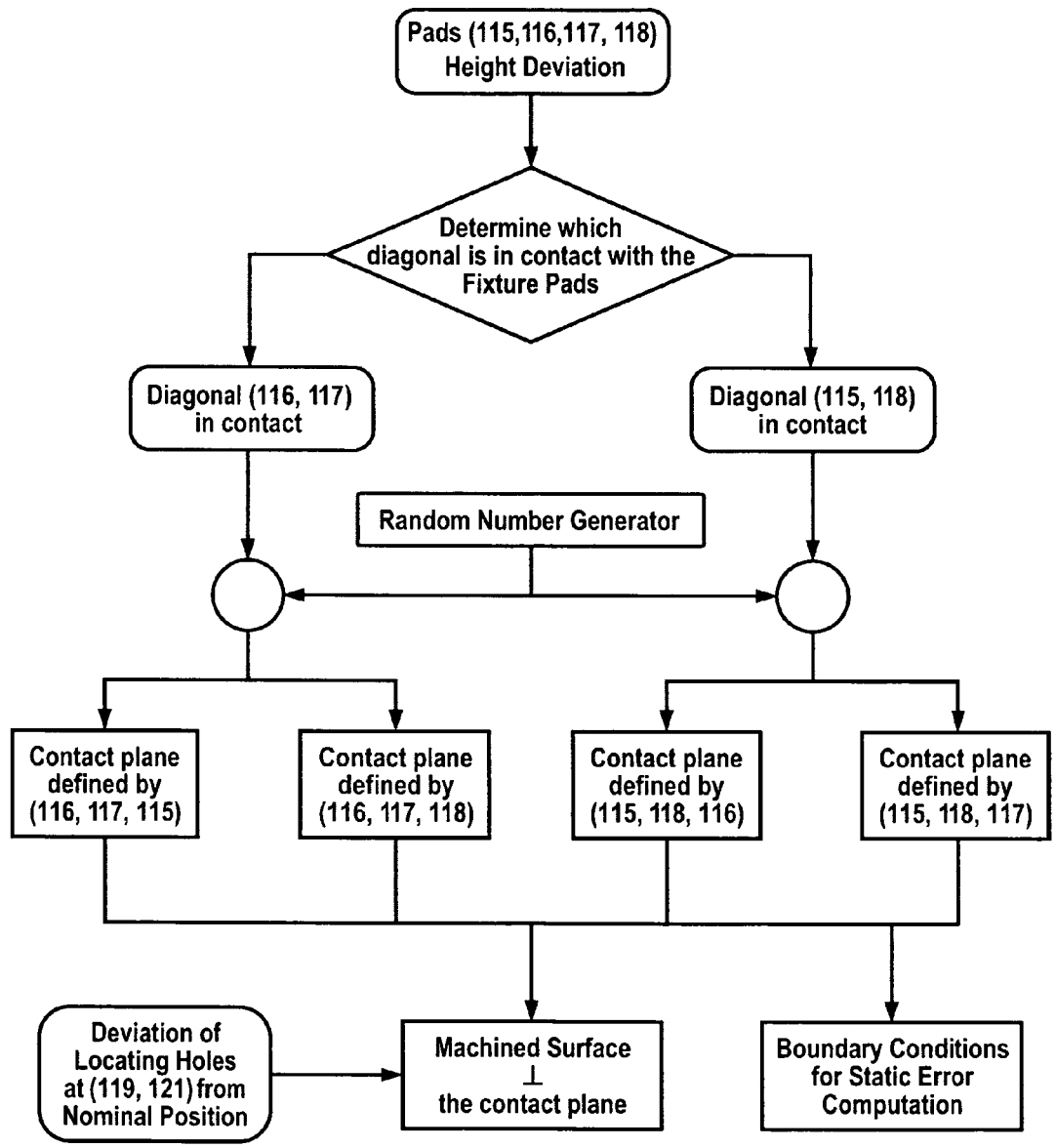
FIG. 5 illustrates a flow diagram of the process of contacting fixture pad determination and the influence upon workpiece orientation.

Fixture pad height differential provides another source of variation included in fixture dimension & stiffness 207. Use of multiple, nominally identical, fixtures per station introduces additional variation in the geometric models 214. So too will fixture pad replacement, though such replacements are generally infrequent and significant production runs will occur between such replacements. Fixture pad height variation results in improper or variable orientation of the workpiece. Therefore, the workpiece coordinate system, $X_p Y_p Z_p$, deviates from the machine coordinate system, $X_m Y_m Z_m$. When four fixture pads are used in supporting a workpiece, i.e. a 4-2-1 locating scheme, five potential unloaded workpiece orientations may occur (two with respect each diagonal pair of fixture pads and one with respect to all four fixture pads). In practice, however, only three of the fixture pads can contact the locator pads of the unloaded workpiece. The workpiece can rock across the diagonal for which the fixture pads and locator pads are in contact. This diagonal is determined, for example by calculating total height of the fixture pads as the vector sum of the deviations from nominal of the fixture pads and the workpiece locator pads. The heights of the fixture pads are measured during the setup of the fixture in the machine. The heights of the workpiece locating pads may be obtained either from actual CMM measurements or a Gaussian distribution fit to such data. The higher diagonal at the intersection of the two diagonals is the one which becomes the axis about which the workpiece will support. It can then be reasonably assumed that either one of the other fixture pads not on this diagonal can be the third contacting fixture pad with equal probability. Once the three part/fixture pads which are in contact have been determined, the influence of the height deviations of the fixture pads on the orientation of the part can be determined. A flow diagram illustrating the process of contacting fixture pad determination and the influence upon workpiece orientation is shown in FIG. 5. Other procedures for modeling the position and orientation of the workpiece on the fixture are known to those having ordinary skill in the art. Modeling of the fixture pad height errors are illustrated as Fixture Variations 214 of the geometric models block 215 of Process Models 211 in FIG. 4. Fixture pad height error at any station level, k, is represented as $e_{f\_pad_k}$. FIG. 5 also illustrates use of the contact plane based on the fixture pad height errors in the boundary conditions for the finite element model of the part in the fixture for the static model 221 and the dynamic model 233. Additionally, the deviation of the locating holes 119 and 121 from nominal position are also used together with the contact plane in definition of machined surfaces perpendicular to the contact plane.

As just demonstrated via the vector summation of fixture and workpiece locating pad deviations, height deviation of the workpiece locating pads causes deviations to the machined surface height from nominal even if the fixture pads are at their nominal height. The immediately prior described process of contacting fixture pad determination and the influence upon workpiece orientation is similarly used to account for the influence of workpiece locating pad deviations from nominal. In the present example, the workpiece locating pads are a feature machined in an upstream station and thus the variation is propagated downstream to stations locating the workpiece off of the workpiece locating pads. As previously described, the heights of the workpiece locating pads may be obtained either from actual CMM measurements or a Gaussian distribution fit to such data. Workpiece locating pad heights are represented in Propagation Model 261 by quality metric $Q_{i,k-1}$ and represents but one example of a feature that propagates variation and error from one station to another. Workpiece locating pad height error at any station level, k, is represented as $e_{wp\_pad_k}$.

When the machine cutter axis is not perpendicular to the deck face 107 it, too, causes variation referred to as spindle axis tilt error. It is common, however, in a milling operation that spindle axis tilt is purposely introduced to effect a slightly raised trailing edge of the cutter that will not mark the cut surface and improve tool life. A slightly concave surface results in a correspondingly concave surface profile. Tilt specifications may provide a satisfactory input for model use; however, it may be preferred to use measured data in place thereof. Spindle axis tilt is provided as Toolpath input 205 in FIG. 4. Geometric relationships among spindle axis tilt and cutter geometry are used in the modeling of the spindle axis tilt errors as represented by Machine Accuracy 213 of the geometric models block 215 of Process Models 211 in FIG. 4. Spindle axis tilt error at any station level, k, is represented as $e_{sp\_axis\_tilt_k}$.

The cutting tool variations 212 include the length, diameter, and runout. It is common for the tools to vary due to their manufacturing process and assembly in the toolholder. For example the runout and the axial length of the milling cutter is affected by how precise the inserts are setup around the cutter body. A specification tolerance range for this error is provided and the cutter setup is acceptable when it is gaged within that range. Therefore, the specification tolerance range is used as the tooling variation 212 in the geometric models 211.

Therefore, a total geometric error at any station level, k, for flatness of the deck face, $E_{Gk}$, is represented as the summation of the individual geometric errors exemplified above as shown below.

$$E_{Gk} = e_{casting_k} + e_{mach\_axis\_misalign_k} + e_{mach\_Zaxis\_accur_k} + \qquad (1)$$
$$e_{mach\_Zaxis\_repeat_k} + e_{f\_pad_k} + e_{wp\_pad_k} + e_{sp\_axis\_tilt_k}$$

The general case, therefore, for the total geometric error at any station for any quality characteristic of any feature is represented as the summation of individual geometric errors as shown below as follows:

$$E_{Gijk} = \sum_G e_{Gijk} \qquad (2)$$

where
  $e_G$=the type of geometric error;
  i=the quality characteristic (e.g. flatness, circularity, etc.);

j=the feature of interest (e.g. surface, hole, thread, etc.); and k=the station.

Having thus described various aspects and relationships related to station level geometric errors characterizing machining lines and specifically applicable to certain exemplary stations of the present cylinder head manufacturing system, a similar description is now given with respect to station level static errors beginning first with clamping distortions.

Elastic deformation of the workpiece occurs when it is clamped in a fixture. And, material is removed from the workpiece surface by the machining process while it is in this elastically deformed state. When the clamping forces are removed, the workpiece relaxes to an unloaded and unstressed condition and the machined surface distorts. This effect is known as clamping distortion.

With the 4-2-1 locating system utilized in the exemplary fixturing, modeling of this clamping distortion includes both distortion modeling and workpiece orientation modeling. As previously described, five different no-load contact orientations exist for the workpiece and fixture. Consequently, five different finite element analysis (FEA) runs are made to determine the clamping distortion data set, $C_{clamping}$. The machining line measures surface height at a plurality of locations on the deck face (in x, y space) of the third (rough milling) and eighth (finish milling) station and the clamping distortions, $C_{clamping}(x, y)$, are needed at these locations. Surface height measurements are preferably made by CMM. An exemplary distribution of twelve such measurement locations is illustrated as individual cross-hair sites not separately labeled in FIG. 1. Totally or partially common or unique sub-sets of such measurement locations may be used for the different station measurements. The effect of the clamping forces on the height of the machined surface can be expressed in the following relationship.

$$\Delta Z_{clamping} = C_{clamping} * F_{clamping}/F_{clamping\ ref} \quad (3)$$

where $\Delta Z_{clamping}$=distortion (deck face height change) caused by clamping;

$C_{clamping}$=distortion(deck face height change) at location (x, y) calculated by FEA for a given set of boundary conditions and a known (i.e. reference) force;

$F_{clamping}$=actual clamping force; and $F_{clamping\ ref}$=reference clamping force for which the FEA was made.

These FEA calculations for the distortion of the workpiece caused by clamping loads (forces) are represented as Clamping Distortion 221 of the Static Models block 220 of Process Models 211 in FIG. 4. Clamping distortion error at any station level, k, is represented as $e_{clamping_k}$.

Cutting distortion provides another source of variation. As was the case for clamping distortion FEA, determining workpiece distortion data sets, $C_{workpiece}$, requires five FEA runs in accounting for the five possible workpiece orientations in the present 4-2-1 locating scheme. The machining line measures surface height at a plurality of locations on the deck face (in x, y space) of the third (rough milling) and eighth (finish milling) station and the workpiece cutting distortions, $C_{workpiece}(x, y)$, are needed at these locations. As with the clamping distortions, surface height measurements are preferably made by CMM and with the exemplary distribution of twelve such measurement locations illustrated in FIG. 1. The effect of the cutting forces on the height of the machined surface can be expressed in the following relationship.

$$\Delta Z_{cutting} = (C_{workpiece} - C_{cutter}) * DOC/DOC_{nom} \quad (4)$$

where $\Delta Z_{cutting}$=the distortion (deck face height change) of the workpiece caused by the cutting forces at location (x, y);

$C_{workpiece}$=the distortion of the part at location (x, y) calculated by FEA for a given set of boundary conditions and the cutting force for the nominal depth of cut;

$C_{cutter}$=the distortion of the cutter at location (x, y) calculated by FEA for given set of boundary conditions and the cutting force for the nominal depth of cut;

DOC=the actual depth of cut at location (x, y); and $DOC_{nom}$=the nominal depth of cut.

The cutting forces are estimated based on the input parameters 201 through the estimation of the area to be cut and the specific energy of the workpiece material.

Material removal depth of cut is influenced by the cutting forces during station machining operations. Cutting force causes deflection of the workpiece toward or away from the cutting tool in accordance with decreasing and increasing cutting forces, respectively. Corresponding deflections of the cutter and cutter/spindle assembly are also effected by the cutting forces. Workpiece and cutter/spindle deflections in turn cause changes in the cutting force and hence depth of cut. It can be appreciated, therefore, that depth of cut varies during the machining operations due to these relationships. This effect varies in significance and is strongly correlated to workpiece stiffness. In the present example of cylinder head manufacturing, the workpiece is relatively stiff and the cutting distortion error in the surface height of the deck face 107 is small relative to other static errors, e.g. clamping distortion errors. Because the DOC is close to $DOC_{nom}$, their ratio would have been only a small perturbation to the cutting deflections which were already small compared to the clamping distortions. Hence, the variation with depth of cut might not be incorporated in the modeling of this example. Moreover, the spindle/cutter deflections were also small compared to the part deflections and hence are reasonably ignored. As a result, the cutting deflections in the present example were based on an approximate model given in the following relationship.

$$\Delta Z_{cutting}(x,y) = C_{workpiece}(x,y) \quad (5)$$

These FEA calculations for the distortion of the workpiece caused by cutting forces are represented as Cutting Distortion 223 of the Static Models block 220 of Process Models 211 in FIG. 4. The cutting distortion is affected by several of the inputs 201 (e.g. casting variations 203, cutting speed and feed 202, and tool and machine stiffness 209) because they affect the cross section of the chip (i.e. area to be cut). Cutting distortion errors at any station level, k, are represented as $e_{wp_k}$ and $e_{spin\_1\_cut_k}$. Kinematic errors of the machine tool are included in static models 220 and are affected by the geometric models of the machine tool. For example, the flatness of the deck face 107 is affected by the straightness of the X-axis motion during the milling process. Therefore, the geometric error of the guide ways contributes to the kinematic errors. The kinematic errors are directly incorporated in propagation model 261 at the individual stations.

Pressing distortion provides another source of variation. The interference fitting of the valve seat pockets 103 and guide holes 105 and the powdered metal seats and guides in the present exemplary cylinder head 100 at the fourth through seventh machining stations permanently distorts aspects of the entire cylinder head 100 including, significantly, the deck face surface and workpiece locating pads. These distortion errors are modeled with FEA as an interference fit and a static model is developed to describe the relationship of the pressing process to various feature qualities incorporated in model 220. For the present pressing station example with respect to the surface distortion of the workpiece locating pads, as with the deviations due to machining, the variation is propagated downstream to stations locating the workpiece off of the workpiece locating pads. As previously described, the heights of the workpiece locating pads may be obtained either from actual CMM measurements or a Gaussian distribution fit to such data. Workpiece locating pad heights are represented in Propagation Model 261 by quality metric $Q_{i,k-1}$ and, in this present pressing station example, represents an example of a feature not machined but altered nevertheless by the station process that propagates variation and error from one station to another. Pressing distortion error at any station level, k, is represented as $e_{press_k}$.

Therefore, a total static error at any station level, k, for flatness of the deck face, $E_{S\ k}$, is represented as the summation of the individual static errors exemplified above as shown below.

$$E_{S\ k} = e_{clamping_k} + e_{wp_k} + e_{spin/cut_k} + e_{press_k} \quad (6)$$

The general case, therefore, for the total static error at any station for any quality characteristic of any feature is represented as the summation of individual static errors as shown below as follows:

$$E_{Sijk} = \sum_S e_{Sijk} \quad (7)$$

where
  $e_S$=the type of static error;
  i=the quality characteristic (e.g. flatness, circularity, etc.);
  j=the feature of interest (e.g. surface, hole, thread, etc.); and
  k=the station.

When metal is cut, energy is expended in deforming the chip and in overcoming friction between the tool and the workpiece. Almost all of this energy is converted to heat, producing high temperatures in the deformation zones and surrounding regions of the chip, tool, and workpiece represented by the static model 220. Cutting temperatures are of interest because they affect machining performance. Temperatures influence the mechanical properties of the work material and thus the cutting forces and the workpiece thermal distortion 222. Therefore, thermal distortion is another form of error incorporated in the static errors 245.

Dynamic models 230 include the thermal growth of the machine 231, the tool wear 232, and the chatter of the cutting tool 233. The thermal growth of the machine and the spindle is estimated based on the average temperature measured with a sensor using the static model 222. For example, if the spindle grows, the area to be cut will change which affects the cutting forces and the depth-of-cut. Thermal growth error at any station level, k, is represented as $e_{t\_growth_k}$. The cutting parameters, the cutting forces and the temperatures affect the tool wear 232. If a model is made available describing the wear rate as a function of cutting parameters and temperature, the dynamic errors along the X, Y, Z axes can be estimated. Wear error at any station level, k, is represented as $e_{wear\ k}$. Chatter 233 is induced by variations in the cutting forces (caused by changes in the cutting velocity or chip cross section) and it is the least desirable type of vibration because the structure enters an unstable vibration condition. Chatter is a complex phenomenon which depends on the design and configuration of both the machine and tooling structures, on workpiece and cutting tool materials, and on machining regimes. The stiffness of the tool, spindle, workpiece, and fixture are important factors. The cutting stiffness of the workpiece material is also an important factor; for example, steels have a greater tendency than aluminum to cause chatter. Cutting conditions, such as depth of cut, width of cut, and cutting speed, greatly affect the onset of chatter. The chatter resistance of a machine tool is often expressed in terms of the maximum allowable width of cut. Therefore, chatter can be estimated using the information from the static models for predicting the dynamic errors 247 due to possible chatter. Chatter error at any station level, k, is represented as $e_{chatter\ k}$.

A total station level dynamic error, $E_{Dk}$, therefore, at any station level, k, is represented as the summation of the individual dynamic errors exemplified above as shown below.

$$E_{Dk} = e_{t\_growth_k} + e_{wear\ k} + e_{chatter\ k} \quad (8)$$

The general case, therefore, for the total dynamic error at any station for any quality characteristic of any feature is represented as the summation of individual dynamic errors as shown below as follows:

$$E_{Dijk} = \sum_D e_{Dijk} \quad (9)$$

where
  $e_D$=the type of dynamic error;
  i=the quality characteristic (e.g. flatness, circularity, etc.);
  j=the feature of interest (e.g. surface, hole, thread, etc.); and
  k=the station.

Therefore, it can be appreciated that a total station level error, $E_{ijk}$, may be represented as the summation of the individual station level errors or the intermediate station level geometric, static and dynamic errors as follows.

$$E_{ijk} = E_{Gijk} + E_{Sijk} + E_{Dijk} \quad (10)$$

Figure 9:
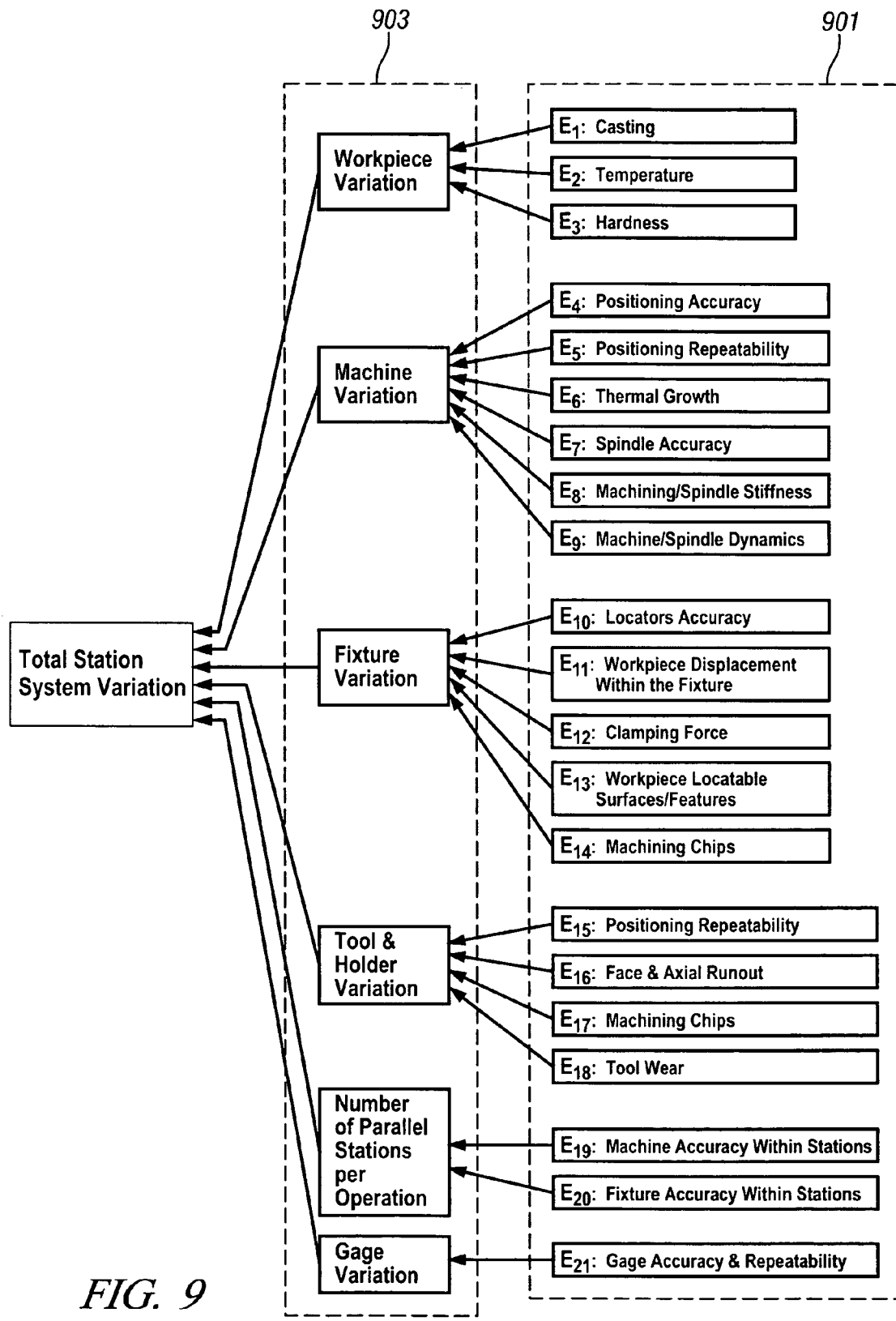
FIG. 9 illustrates a station level variation source categorization of non-exhaustive exemplary machining process error types.

The preceding description has provided certain examples of error types related specifically to the application specific embodiment of machining the deck face 107 of a cylinder head 100. Furthermore, these error types have been categorically described with respect to geometric, static and dynamic nature of the errors (e.g. equations 1, 6 and 8). And, generic cases for such categorical error types have been set forth at the station level (e.g equations 2, 7 and 9) as well as for a total station level error determined therefrom (e.g. equation 10). One skilled in the art will appreciate alternative categorical representations of error types and the existence of additional error types apart from those specifically used in the exemplary embodiment related to cylinder head 100 deck face 107. For example, FIG. 9 illustrates at station level a more extensive—though still non-exhaustive—group of error types 901 and alternative categorical relationships 903 related to variation sources in the machining process therefor.

Figure 6:
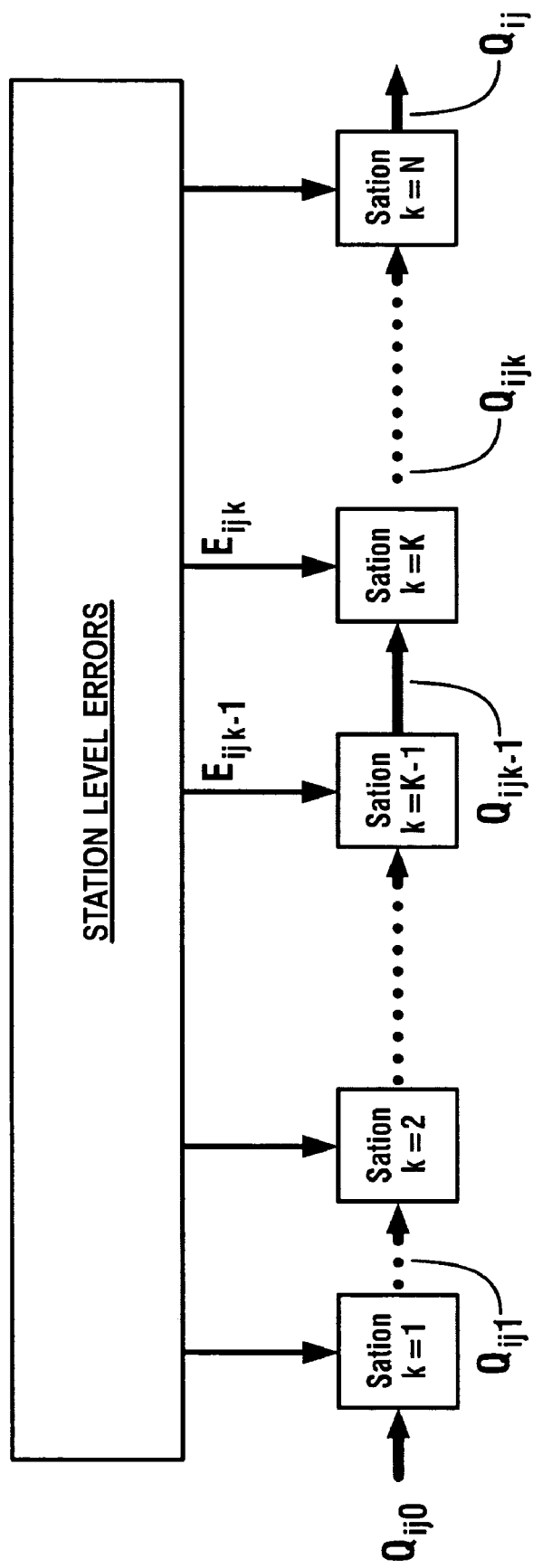
FIG. 6 illustrates a high level representation of a workpiece quality prediction model for a multistage manufacturing system including a plurality of generated station level workpiece errors and station-to-station error propagation.

With reference now to FIG. 6, a high level representation of workpiece quality prediction is illustrated. A multistage manufacturing system includes N stations. Total station level errors, $E_{ijk}$, are generated, in accordance with station level workpiece error generation models as described herein above in accordance with FIG. 4. Station progression is from left to right in the figure. The quality metric, Q, is with respect to the quality characteristic, i, of the feature of interest, j. $Q_{ijk}$ is updated at each station, k, in accordance with the station level error corresponding to the respective quality characteristic of the feature of interest, $E_{ijk}$. The overall process error is represented by the following relationship which exemplifies the vectorial summation of individual station errors:

$$Q_{ij} = \sum_{k=1}^{N} E_{ijk} \quad (11)$$

where

Q=the quality metric;
E=the station level error;
i=the quality characteristic (e.g. flatness, circularity, etc.);
j=the feature of interest (e.g. surface, hole, thread, etc.); and
k=the station.

Any vectorial analysis is valid for the determination of $Q_{ij}$ and the intermediate station level $Q_{ijk}$. Mean and variance values of the distribution for $Q_{ij}$ developed in the model runs, as well as for the intermediate station level $Q_{ijk}$ can be developed.

Commercial tolerance simulation tools allowing component tolerance simulation and providing analytical capabilities to model the effect of tolerance variations on an assembly, determine the robustness of designs, and test alternative tolerance schemes can be employed in conjunction with the methodologies described herein above. One such product is commonly known as 3DCS software, commercially available from Dimensional Control Systems, Inc., Troy, Mich., USA. Other similar variational analysis tools include Visual VSA available from UGS Corp. Plano, Tex., USA. Such software may be adapted to automate the propagation of errors among the manufacturing stations as described.

Figure 7:
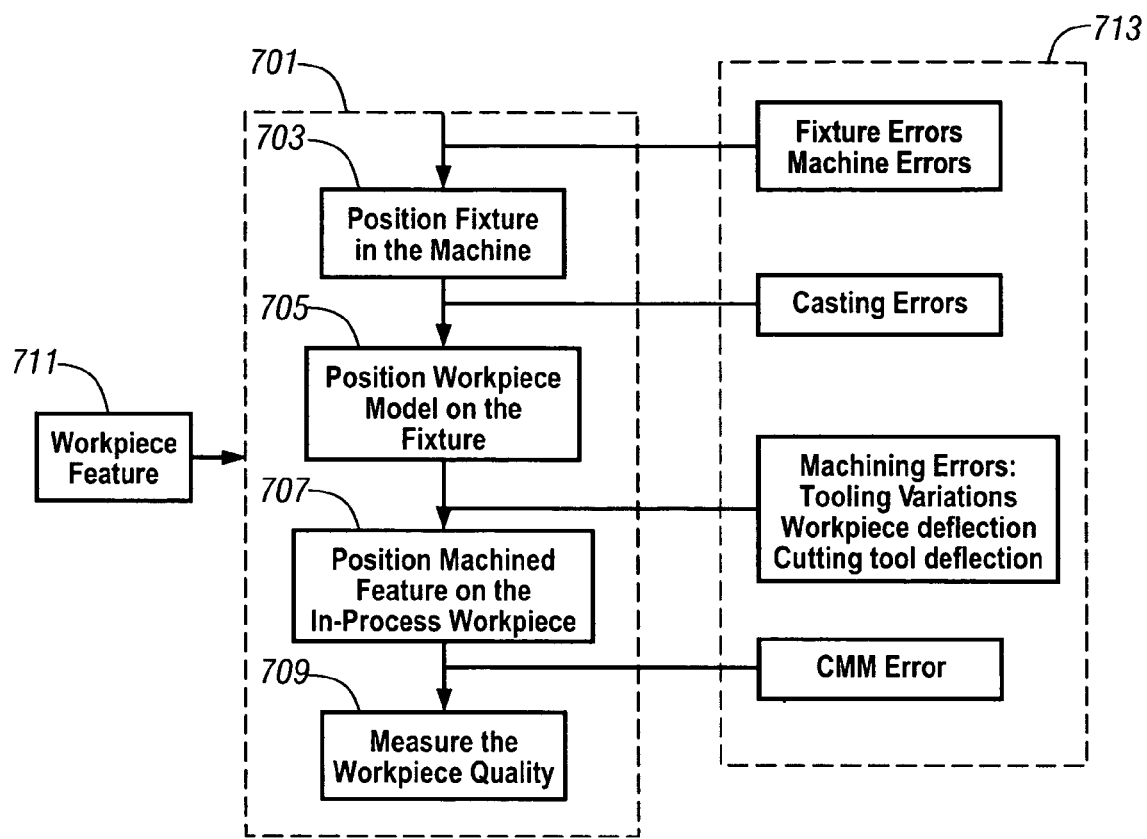
FIG. 7 illustrates generic machining steps decomposed into generic models in accordance with the present invention.

The present invention enables error modeling decomposition of a workpiece being machined at a single station or multiple stations throughout a multistage manufacturing system. With this decomposition, each machining process at a particular machining station 701 is decomposed into four generic steps as illustrated in the diagram of FIG. 7. First, a model of the station fixture is positioned in the machine 703. Next, the model of the in-process workpiece is placed on the station fixture 705. Then, the machined feature 711 is placed on the in-process workpiece 707. Finally, the workpiece is measured 709. At all steps in the decomposed process 701, appropriate station level errors 713 are introduced. One skilled in the art will recognize that stations may be segmented in nature wherein a machine tool may be operative to machine multiple features such as where a plurality of hole features may be drilled by a single tool. Or, stations may be characterized by a plurality of discrete tool operations performed to effect different features. Alternatively, a station may be characterized by multi-pass feature machining wherein tool changes are performed such as, for example, a hole feature machined by sequential drilling and boring operations using a common spindle. Yet another example of the variety that may be practiced is a station whereat different features are machined using a single compound or multi-purpose tool, for example a drill-thread-countersink operation or the simpler example of a bore-counterbore operation. One skilled in the art will further recognize variations and station compounding of these examples. Furthermore, and with additional reference to FIG. 7, such variety of station machining operations are represented therein by multiple or repetitive performance of the generic block 707 wherein each such repetition may represents a level of decomposition in a particular feature.

Figure 8:
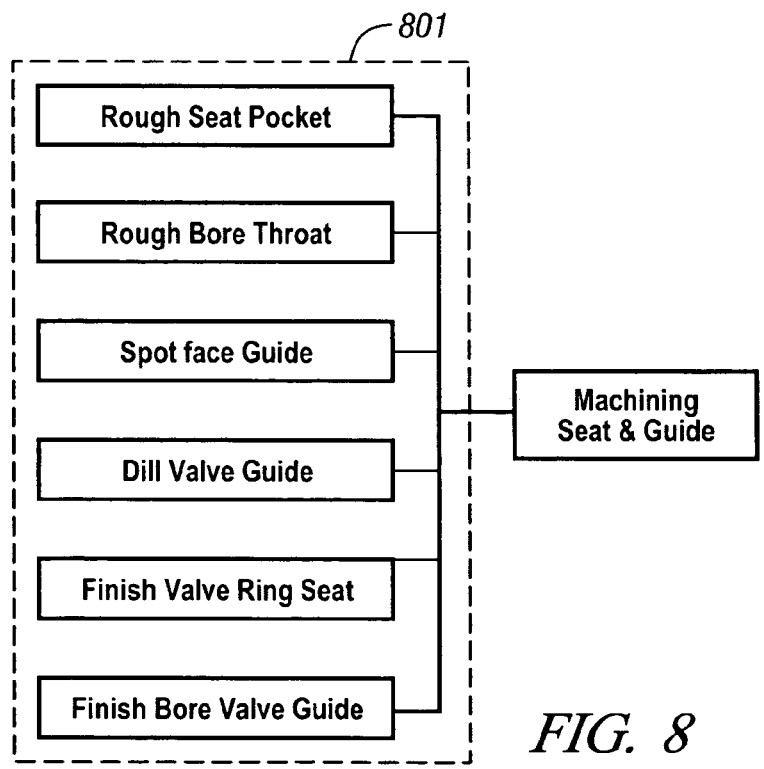
FIG. 8 illustrates an exemplary multi-step station machining process decomposed into separate component models in accordance with the present invention.

The present invention also enables decomposition of the part features into separate components. The quality metrics of each component are modeled and the relation of the quality metrics among the components is specified depending on the cutting tool and process characteristics. The components are then grouped into operations. For example, as illustrated in FIG. 8, each feature in a multistep machining process 801 of the seat pockets 103 and guide holes 105 is modeled as a separate component and then the components are grouped depending on the cutting tool and the process used for manufacturing the seat pockets 103 and guide holes 105 as illustrated in FIG. 8.

In addition, the present invention enables the decomposition of the machining system into several components such as: pre-machined workpiece or cast part characteristics, machine tool characteristics, spindle characteristics, fixture characteristics, cutting tool and toolholder characteristics and gauging characteristics.

The decomposition allows preparation of all the required inputs errors for each of the system components in a particular format accepted by commercial tolerance simulation tools that propagate the errors among the individual components and through multiple machining stations of a manufacturing process and then calculates the total statistical error. The present invention generates the following inputs:

1. Import the component entities (points, lines, circles and etc.) for use as visual aids.
2. Based on the component entities, define a set of points as needed to describe each system component, machined part feature, and reference frames for measuring the machined part features.
3. Define the sequence in which the different operations in the process go together via the software's move functions.
4. Define the range of variations for significant errors via the software's tolerance functions.
5. Track the critical dimensions in the process that are affected by machine tool, fixture, cutting tools, and cutting process tolerances via the software's measurement functions.

The commercial tolerance simulation tool software itself consists of a number of routines, which are used to track accumulating errors or tolerances, for the factors of variations, as a workpiece is machined at sequential stations. After a model of the process has been built, the tolerances are applied and the quality is simulated. The variation is provided either from a predictive algorithm or a suggested statistical distribution. The predictive algorithms are analytical or empirical models based on Finite Element Analysis (FEA) results.

Relating back to the prior description and FIG. 4, the key product input variables (KPIV) for 3DCS are the known inputs as described with respect to FIG. 4, which describe the variability of the system setup parameters. Generic process models are used to model the individual machining processes and correspond to the Process Models 211 in FIG. 4. The simplest process models can be used directly as the station level error model, for example, a machine accuracy which might be specified as a mean, $\eta$, and a variance, $\sigma$. In complicated cases, such as clamping distortions, the process models become the FEA as described, which must be run for a number of boundary conditions to generate an intermediate database. The station level error model is an algorithm that determines the part distortion as a function of the station level process parameters such as variations in clamping force or part geometry as it affects fixturing. Key Product Output Variables (KPOV) or errors are tracked and accumulated, station-by-station by the 3DCS software. Information such as variation in the depth-of-cut propagates from the 3DCS predictions for the current station into the error models for the following stations.

The Monte Carlo method was adapted in the present method to vectorial sum all anticipated and predicted errors during manufacturing of the features of interest. One advantage of the Monte Carlo method is that it lets the user enter a probability distribution for each feature error. The 3DCS model accepts multiple statistical distributions to define the variation for each KPIV or estimated KPOV. The feature errors are then summed using 3DCS software. The Monte Carlo simulation will run a specified number of parts M. Each part travels from station to station through the machining process modeled in 3DCS software, and a random error (within its statistical distribution) for each KPOV can be assigned for each machined feature. After the desired number of the same features is manufactured (i.e. M), standard statistics are used to determine the nominal and the variance (tolerance) values for the features.

While the present invention has been described with respect to certain preferred embodiments and particular applications, it is understood that the description set forth herein above is to be taken by way of example and not of limitation. Those skilled in the art will recognize various modifications to the particular embodiments are within the scope of the appended claims. Therefore, it is intended that the invention not be limited to the disclosed embodiments, but that it has the full scope permitted by the language of the following claims.

The invention claimed is:

1. Method for predicting feature quality in workpieces produced by a multi-station machining process, comprising:
    decomposing the multi-station machining process into sources of variation including machine variations, fixture variations and workpiece variations;
    reticulating the multi-station machining process into machining stations;
    determining workpiece feature errors at each machining station based on the sources of variation;
    summing workpiece feature errors into station level errors; and
    using the station level errors to statistically predict feature quality.

2. The method for predicting feature quality in workpieces as claimed in claim 1 wherein determining workpiece feature errors further comprises decomposing each machining station into generic machining process steps and determining workpiece errors at each generic machining process step based on the sources of variation uniquely related to the respective generic machining process step.

3. The method for predicting feature quality in workpieces as claimed in claim 1 wherein machine variations comprise at least one of toolpath variations and machine distortions.

4. The method for predicting feature quality in workpieces as claimed in claim 1 wherein fixture variations comprise at least one of fixture pad variations, fixture distortions, fixture position and fixture orientation.

5. The method for predicting feature quality in workpieces as claimed in claim 1 wherein workpiece variations comprise at least one of workpiece casting variations, workpiece pad variations, workpiece clamping distortions, workpiece cutting distortions and workpiece pressing distortions.

6. Method for predicting feature quality in workpieces produced by a multi-station machining process including at least one machine and one fixture, comprising:
    identifying a workpiece feature and a quality metric corresponding thereto;
    reticulating the multi-station machining process into machining stations;
    performing a plurality of station level error determinations for each of the machining stations, each determination including providing errors that significantly affect the quality metric of the feature and summing the errors to provide a station level error for each determination, wherein a respective plurality of station level errors is provided for each of the machining stations; and
    using the station level errors to statistically predict the feature quality with respect to the quality metric.

7. The method for predicting feature quality in workpieces as claimed in claim 6 wherein the feature quality is predicted with respect to the machining process in its entirety and using the station level errors to statistically predict the feature quality with respect to the quality metric comprises summing the station level errors from each of the machining stations.

8. The method for predicting feature quality in workpieces as claimed in claim 6 wherein the feature quality is predicted at a particular one of the machining stations and using the station level errors to statistically predict the feature quality with respect to the quality metric comprises summing the station level errors from each of the machining stations within a range beginning with an initial machining station and ending with the particular one of the machining stations.

9. The method for predicting feature quality in workpieces as claimed in claim 8 wherein the initial machining station is the first machining station of the machining process.

10. The method for predicting feature quality in workpieces as claimed in claim 8 wherein the initial machining station is a machining station subsequent to the first machining station of the machining process.

11. The method for predicting feature quality in workpieces as claimed in claim 6 wherein providing errors that significantly affect the quality metric of the feature comprises providing errors resulting from another error effected upon another workpiece feature at another machining station.

12. The method for predicting feature quality in workpieces as claimed in claim 6 wherein errors provided comprise errors resulting from machine variations.

13. The method for predicting feature quality in workpieces as claimed in claim 6 wherein errors provided comprise errors resulting from fixture variations.

14. The method for predicting feature quality in workpieces as claimed in claim 6 wherein errors provided comprise errors resulting from workpiece variations.

15. The method for predicting feature quality in workpieces as claimed in claim 12 wherein machine variations comprise toolpath variations, machine distortions and combinations thereof.

16. The method for predicting feature quality in workpieces as claimed in claim 13 wherein fixture variations comprise at least one of fixture pad variations, fixture distortions, fixture position and fixture orientation.

17. The method for predicting feature quality in workpieces as claimed in claim 14 wherein wherein workpiece variations comprise at least one of workpiece casting variations, workpiece pad variations, workpiece clamping distortions, workpiece cutting distortions and workpiece pressing distortions.

18. The method for predicting feature quality in workpieces as claimed in claim 6 wherein errors provided comprise at least one of geometric errors, static errors and dynamic errors.

19. The method for predicting feature quality in workpieces as claimed in claim 6 wherein errors provided comprise measured errors.

20. The method for predicting feature quality in workpieces as claimed in claim 6 wherein errors provided comprise modeled errors.

* * * * *